United States Patent Office 2,707,188
Patented Apr. 26, 1955

2,707,188

THIOPHENE DERIVATIVES AND PROCESSES FOR PRODUCING THE SAME

Paul Gailliot and Jean Baget, Paris, France, assignors, by mesne assignments, to Parke, Davis & Company, Detroit, Mich., a corporation of Michigan No Drawing. Application September 15, 1950, Serial No. 185,155

Claims priority, application France September 21, 1949

6 Claims. (Cl. 260—332.3)

This invention concerns new thiophene derivatives and processes for producing the same.

It is the object of the present invention to provide a new thiophene derivative having unexpectedly marked bactericidal properties and useful, therefore, as a pharmaceutical or veterinary product.

The new thiophene derivative of the present invention is 2-dichloracetamido-1-(5'-nitro-2'-thienyl)-propane 1:3-diol having the structural formula:

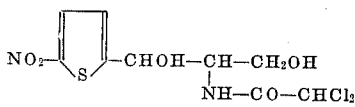

In accordance with a feature of this invention, this new compound is obtained by nitrating the triacetate of 2-amino-1-(2'-thienyl)-propane 1:3-diol by means of nitric acid, which may be used in the presence, for example, of acetic anhydride, deacetylating the product as by treatment with alcoholic hydrochloric acid to form 2-amino-1-(5'-nitro-2'-thienyl)-propane 1:3-diol which is then reacted with methyl dichloracetate, desirably in methanol solution in the presence of triethylamine.

The thiophene compound of this invention, as also the triacetylamino compound from which it is obtainable, contains two asymmetric carbon atoms and can exist in two structural forms as well as optical isomeric forms. The term "structural" refers to the spatial relationship of the polar groups respectively attached to the two asymmetric carbon atoms. In conformity with the nomenclature adopted by M. C. Rebstock, N. H. Crooks, J. Controulis, Q. R. Bartz, L. N. Long and N. D. Troutman in the Journal of the American Chemical Society 1949, volume 71, pages 2458 to 2475, the structural isomeric forms are designated "erythro" and "threo" respectively. Both erythro and threo forms can, of course, exist as racemates of optically active isomers. Of particular therapeutic interest is the racemic threo form.

The present invention is illustrated by the following example.

EXAMPLE

*The triacetate of DL-threo-2-amino-1-(5'-nitro-2'-thienyl)-propane 1:3-diol*

15 g. of the triacetate of DL-threo-2-amino-1-(2'-thienyl)-propane 1:3-diol were dissolved in 50 g. of acetic anhydride. The mixture was cooled to +5° C. and a solution of 37 g. of fuming nitric acid (sp. gr. 1.48) in 35 g. of acetic anhydride was gradually added with stirring during one hour, the temperature being maintained at between +5° and +10° C. When the addition was completed, agitation was continued for a further hour. The reaction mixture was then poured on to 200 g. of crushed ice and neutralised to pH 7 by means of sodium carbonate. The product was extracted with chloroform (100 cc. in three stages) and the chloroform was then distilled off in vacuo. The residue was taken up in 50 cc. of anhydrous diethyl ether. The product was then centrifuged, washed and dried in vacuo. 7.8 g. of the triacetate of DL-threo-2-amino-1-(5'-nitro-2'-thienyl)-propane 1:3-diol was thereby obtained. Melting point=114°–115° C. (inst.—Maquenne block).

*DL-threo-2-amino-1-(5'-nitro-2'-thienyl)-propane 1:3-diol (picrate)*

15 g. of the said triacetyl derivative were dissolved in 100 cc. of absolute alcohol and 100 cc. of 2 N hydrochloric acid solution were added. The mixture was heated on a water bath under reflux for one half hour. It was then cooled and brought to pH 3.5 by means of sodium carbonate. The solvents were distilled off in vacuo at about 30°–35° C. The residue was taken up in absolute alcohol and the insoluble sodium chloride filtered off. The alcohol was then removed in vacuo and the residue taken up in 100 cc. of distilled water. 135 cc. of a ⅓ N lithium picrate solution were added; the mixture was left in the cold over-night, centrifuged, washed with ether and dried in vacuo. 12.2 g. of DL-threo-2-amino-1-(5'-nitro-2'-thienyl)-propane 1:3-diol picrate were thereby obtained. Melting point=100°–101° C. (inst., Maquenne block).

*DL-threo-2-dichloracetamido-1-(5'-nitro-2'-thienyl)-propane 1:3-diol*

A solution of 12.2 g. of the said picrate in 67.5 cc. of 2 N HCl was extracted with benzene.

After the benzene had been decanted, the aqueous phase was brought to pH 3.5 by means of sodium carbonate. The water was evaporated off in vacuo at about 30°–35° C. The product was taken up in absolute alcohol and the insoluble sodium chloride filtered off. After evaporation of the alcohol in vacuo, the residue was dissolved in 25 cc. of methanol and 10 cc. of methyl dichloracetate were added. 2.7 g. of triethylamine were then gradually added, with heating under reflux on a water bath. The mixture was boiled under reflux for one hour, whereafter the alcohol and excess ester were distilled off at about 50°–60° C. under a vacuum of 1 mm. Hg. The residual oil was taken up in 50 cc. of distilled water, and the product which precipitated was centrifuged, washed and dried in vacuo. After recrystallisation from a mixture of 10% methanol and 90% water, 4.3 g. of DL-threo-2-dichloracetamido-1-(5'-nitro-2'-thienyl)-propane 1:3-diol was obtained. Melting point=129°–130° C. (inst., Maquenne block).

The triacetate of 2-amino-1-(2'-thienyl)-propane 1:3-diol (melting point=74°–75° C.) used as starting material was prepared by known methods through the intermediary of the following substances:

Isonitrosoacetothienone (melting point=111°–112° C. (Barger and Easson Soc., 1938, 2103).

Acetylaminomethyl thienyl ketone (melting point=120°–121° C.) (reduction by stannous chloride, acetylation). (2-hydroxy-1-acetylamino ethyl)-thienyl ketone (melting point=114°–115° C.) (condensation with formaldehyde). 2-acetylamino-1-(2'-thienyl)-propane 1:3-diol (melting point=138°–139° C.) (Meerwein reduction).

We claim:

1. A compound of the class consisting of the 2-X-1-(5'-nitro-2'-thienyl)-propane 1:3-diols, where X is selected from the class consisting of amino and dichloracetamido.

2. DL-threo-2-dichloracetamido-1-(5'-nitro-2'-thienyl)-propane 1:3-diol.

3. DL-threo-2-amino-1-(5'-nitro-2'-thienyl)-propane 1:3-diol.

4. A process for producing a new thiophene derivative which comprises nitrating the triacetate of 2-amino-1-(2'-thienyl)-propane 1:3-diol, hydrolysing off the acetyl groups to form 2-amino-1-(5'-nitro-2'-thienyl)-propane 1:3-diol and reacting that product with methyl dichloracetate to form 2-dichloracetamido-1-(5'-nitro-2'-thienyl)-propane 1,3 diol.

5. A process for producing a new thiophene derivative which comprises nitrating the triacetate of 2-amino-1-(2'-thienyl)-propane 1:3-diol by treatment with fuming nitric acid in the presence of acetic anhydride, hydrolysing off the acetyl groups by treatment with alcoholic hydrochloric acid to form 2-amino-1-(5'-nitro-2'-thienyl)-propane 1:3-diol and reacting that product with methyl dichloracetate in methanol solution in the presence of triethylamine to form 2-dichloracetamido-1-(5'-nitro-2'-thienyl)-propane 1,3 diol.

6. 2-dichloracetamido-1 - (5'-nitro-2'-thienyl)-propane 1,3 diol.

References Cited in the file of this patent

UNITED STATES PATENTS

| | | |
|---|---|---|
| 2,103,266 | Lott | Dec. 28, 1937 |
| 2,483,871 | Bartz | Oct. 4, 1949 |
| 2,483,884 | Crooks et al. | Oct. 4, 1949 |
| 2,483,885 | Crooks et al. | Oct. 5, 1949 |
| 2,514,376 | Crooks | July 11, 1950 |

OTHER REFERENCES

Williams: Detoxication Mechanisms, pp. 194, 197, 198, Wiley, N. Y., 1947.
Lands: Proc. Soc. Exp. Bio. Med. 57, 55–6 (1944).
Alles: J. Pharm. Exp. Ther. 72, 265 (1941).
Powers: Advancing Fronts in Chemistry, vol. II, page 33, Reinhold Pub. Co., N. Y., 1946.
Caesar and Sachanen: Ind. Eng. Chem. 40, 922 (1948).
Le Suer, W. M.: 3-Substituted Thiophenes, page 2, Doctorate Thesis, Indiana University, January 1948.
Ex parte Bywater 83 USPQ 4.
Keskin: J. Org. Chem. 16, #9.
Rebstock: J. Am. Chem. Soc. 71 (1949), 2458–68.
Long: J. Am. Chem. Soc. 71 (1949), 2469–2475.
Blicke: J. Am. Chem. Soc. 66 (1945), 1645.
Viaud: Produits Pharmaceutiques 2, 53 and 54 (1947).
Steinkopf: Die Chemie des Thiophens, page 21, Edwards Lithoprint (1941).
Whitmore: Organic Chemistry, pp. 884, 893, Van Nostrand, N. Y., 1937.
Bernthsen and Sudborough: Or. Chem., p. 549, Van Nostrand, N. Y., 1925.
Richter: Or. Chem., pp. 649, 650, Wiley, N. Y., 1938.